| (12) | United States Patent | (10) Patent No.: | US 9,428,875 B2 |
|---|---|---|---|
| | Izumi et al. | (45) Date of Patent: | Aug. 30, 2016 |

(54) PNEUMATIC FENDER

(71) Applicant: The Yokohama Rubber Co., LTD., Minato-ku, Tokyo (JP)

(72) Inventors: Minami Izumi, Hiratsuka (JP); Shigeki Sakakibara, Hiratsuka (JP); Michito Kaneko, Hiratsuka (JP); Shu Yamada, Hiratsuka (JP); Yoshiaki Hara, Hiratsuka (JP); Akihiro Iemoto, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/435,147

(22) PCT Filed: Oct. 11, 2013

(86) PCT No.: PCT/JP2013/077723
§ 371 (c)(1),
(2) Date: Apr. 10, 2015

(87) PCT Pub. No.: WO2014/058044
PCT Pub. Date: Apr. 17, 2014

(65) Prior Publication Data
US 2015/0345092 A1 Dec. 3, 2015

(30) Foreign Application Priority Data

Oct. 11, 2012 (JP) .................... 2012-225814
May 16, 2013 (JP) .................... 2013-104184

(51) Int. Cl.
*E02B 3/26* (2006.01)
*B63B 59/02* (2006.01)

(52) U.S. Cl.
CPC ............ *E02B 3/26* (2013.01); *B63B 2059/025* (2013.01)

(58) Field of Classification Search
CPC .................. B63B 2059/025; B60G 17/0155; E02B 3/26; B60R 19/20
See application file for complete search history.

(56) References Cited

U.S. PATENT DOCUMENTS 3,854,706 A * 12/1974 Johnston .................. F16F 9/50
114/219
4,176,858 A * 12/1979 Kornhauser ............ B60R 19/20
280/734

FOREIGN PATENT DOCUMENTS

| JP | 57070750 A | * | 5/1982 |
| JP | H04-038314 | | 2/1992 |
| JP | 04208660 A | * | 7/1992 |
| JP | H10-001928 | | 1/1998 |
| JP | H11-152728 | | 6/1999 |
| JP | 2009-235782 | | 10/2009 |

OTHER PUBLICATIONS

International Search Report for International Application No. PCT/JP2013/077723 dated Nov. 12, 2013, 2 pages, Japan.

* cited by examiner

*Primary Examiner* — Edwin Swinehart
(74) *Attorney, Agent, or Firm* — Thorpe North & Western

(57) ABSTRACT

Provided is a pneumatic fender that suppresses damage to a flexible hollow body and an energy-absorbing body and exhibits improved ship sway reduction effects. A pneumatic fender is provided with an orifice that allows for communication between an interior space of a flexible hollow body and the interior space of the casing, and a safety valve that opens and allows for communication between the internal space of the flexible hollow body and the internal space of the casing by opening when the internal pressure of the flexible hollow body reaches a predetermined pressure.

10 Claims, 15 Drawing Sheets

PNEUMATIC FENDER

TECHNICAL FIELD

The present technology relates to a pneumatic fender, and, more specifically, to a pneumatic fender that suppresses damage to a flexible hollow body and an energy-absorbing body and exhibits improved ship sway reduction effects.

BACKGROUND

One type of pneumatic fender is a pneumatic fender comprising a flexible hollow body provided between two mounting plates. The flexible hollow body is formed from rubber in which a reinforcing layer is embedded, and is connected to the mounting plates in an airtight manner. A rear surface side of one mounting plate is mounted to a quay or the like, and a front side of the other of the mounting plates contacts a ship via a shock-receiving plate. The flexible hollow body is compressed when the ship contacts the shock-receiving plate, causing the energy from the ship to be absorbed. When an excessive amount of energy is imparted by the ship, such as when the ship forcefully collides with the shock-receiving plate, the flexible hollow body may be excessively compressed, causing damage thereto.

A pneumatic fender in which a honeycomb-structured energy-absorbing body is provided within a flexible hollow body has been proposed (see Japanese Unexamined Patent Application Publication No. H11-152728A). In accordance with this pneumatic fender, the mounting plate on the front side contacts the energy-absorbing body and absorbs the energy from the ship before the flexible hollow body is excessively compressed, thereby allowing for a reduction in disadvantages such as damage to the flexible hollow body due to excess compression. However, because the energy-absorbing body is deformed and damaged by absorbing energy, it will cease functioning as an energy-absorbing body if the degree of damage is too great, requiring the pneumatic fender to be replaced.

In addition, when the compressed flexible hollow body is restored to its original state, the ship, which had been in contact with the pneumatic fender, sways; thus, it is necessary to reduce the swaying of the ship as much as possible. Thus, there is a demand for a pneumatic fender that suppresses damage to a flexible hollow body and an energy-absorbing body and allows for further reduction in ship sway.

SUMMARY

The present technology provides a pneumatic fender that suppresses damage to a flexible hollow body and an energy-absorbing body and exhibits improved ship sway reduction effects.

A pneumatic fender according to the present technology is a pneumatic fender comprising a flexible hollow body provided between facing mounting plates, the fender comprising: an orifice that allows for communication between an interior space of the flexible hollow body and an interior space of a rigid casing that is provided on a surface of one of the mounting plates; and a safety valve that opens and allows for communication between the interior space of the flexible hollow body and the interior space of the casing by opening when the internal pressure of the flexible hollow body reaches a predetermined pressure.

In accordance with the present technology, the safety valve opens when the internal pressure of the flexible hollow body reaches a predetermined pressure, allowing for communication between the interior space of the flexible hollow body and the interior space of the casing via the safety valve; thus, when the internal pressure of the flexible hollow body reaches a certain degree, air can flow into the inner space of the casing, suppressing increases in the internal pressure of the flexible hollow body. Damage to the flexible hollow body due to excessive compression can thus be suppressed.

Air having flowed into the inner space of the casing then gradually returns to the inner space of the flexible hollow body through the orifice, which has a narrow opening area. The flexible hollow body is thus restored to its pre-compression state, allowing for repeated use over extended periods of time without causing damage to the casing functioning as an energy-absorbing body. In addition, the flexible hollow body is restored to its pre-compression state at a slow speed, reducing the counter force produced by this restoration. As a result, swaying of the ship contacting the pneumatic fender during this restoration can be further reduced.

DETAILED DESCRIPTION

Figure 1:
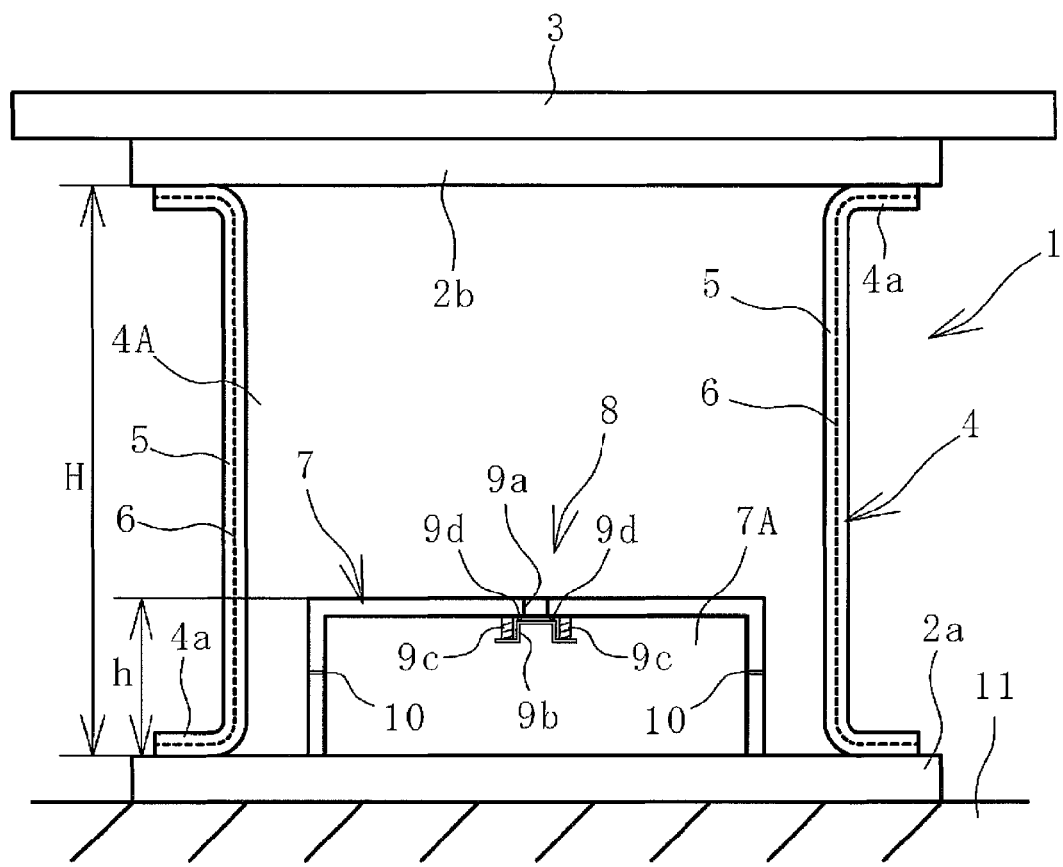
FIG. 1 is a cross-sectional view illustrating an embodiment of a pneumatic fender according to the present technology in which a casing is provided within an inner space of a flexible hollow body.

The pneumatic fender according to the present technology will now be described on the basis of the embodiments illustrated in the drawings.

The pneumatic fender 1 according to the present technology illustrated in FIG. 1 (hereinafter, referred to as "the fender 1") is provided with a mounting plate 2a, a mounting plate 2b, and a flexible hollow body 4. The one mounting plate 2a is mounted on a quay 11 or the like, and a shock-receiving plate 3 is mounted on a front side of the other mounting plate 2b. The shock-receiving plate 3 contacts a side of a ship or the like.

The flexible hollow body 4 is interposed between the mounting plate 2a and the mounting plate 2b and is joined to the mounting plates 2a, 2b in an airtight manner. The flexible hollow body 4 has a cylindrical shape provided with flanges 4a on both ends, and is constituted by rubber 5 in which a reinforcing layer 6 has been embedded. The spacing H between the mounting plate 2a and the mounting plate 2b, i.e., the height dimension of the flexible hollow body 4, is set on the basis of the energy absorption performance and the like required for the fender 1.

A casing 7 having a projection height h is provided on a surface of the one mounting plate 2a positioned within the interior of the flexible hollow body 4, and is disposed within an inner space 4A of the flexible hollow body 4. The casing 7 is a rigid structure formed from a rigid material such as steel or iron. The casing 7 prevents damage caused by excess compression of the flexible hollow body 4.

The casing 7 can also be disposed projecting from a surface of the other mounting plate 2b within the inner space 4A of the flexible hollow body 4. If the casing 7 is mounted on the other mounting plate 2b, the weight of the casing 7 acts upon the flexible hollow body 4, which is cantileveringly disposed with respect to the quay 11. Thus, it is preferable to mount the casing 7 to the one mounting plate 2a anchored to the quay 11 in order to eliminate the load applied to the flexible hollow body 4 by the weight of the casing 7.

The casing 7 is provided with an orifice 10 and a safety valve 8. The orifice 10 allows for communication between the space outside the casing 7 within the interior space 4A of the flexible hollow body 4 and an interior space 7A of the casing 7. A small hole (having, for example, an opening area of about 0.5 mm² to 80 mm² or an opening diameter of about 1 mm to 10 mm) formed in a wall of the casing 7 can be used as the orifice 10. The orifice 10 is not limited to being a small hole; any structure that yields the same effects as a small hole can be used. There is no particular limitation upon the number of orifices 10, but it is preferable to provide a plurality thereof as they can conceivably become blocked for various reasons.

The safety valve 8 opens when the internal pressure P of the flexible hollow body 4 (i.e., the pressure of the space within the inner space 4A and outside the casing 7) reaches a predetermined pressure P1. The space in the inner space 4A outside the casing 7 and the inner space 7A of the casing 7 communicate through the open safety valve 8.

The safety valve 8 of the present embodiment is constituted by a through-hole 9a formed in a wall of the casing 7, a valve body 9b, a biasing member 9c such as a spring, and a sealing member 9d. The valve body 9b is biased by the biasing member 9c toward the wall in which the through-hole 9a is formed. The sealing member 9d, which is mounted to the valve body 9b, is compression bonded to the wall so as to surround the periphery of the through-hole 9a, thereby closing the safety valve 8 closes to block the through-hole 9a. The safety valve 8 is not limited to the structure described in the present embodiment; any structure in which the safety valve 8 opens when the internal pressure P of the flexible hollow body 4 reaches the predetermined pressure P1 is acceptable.

Figure 2:
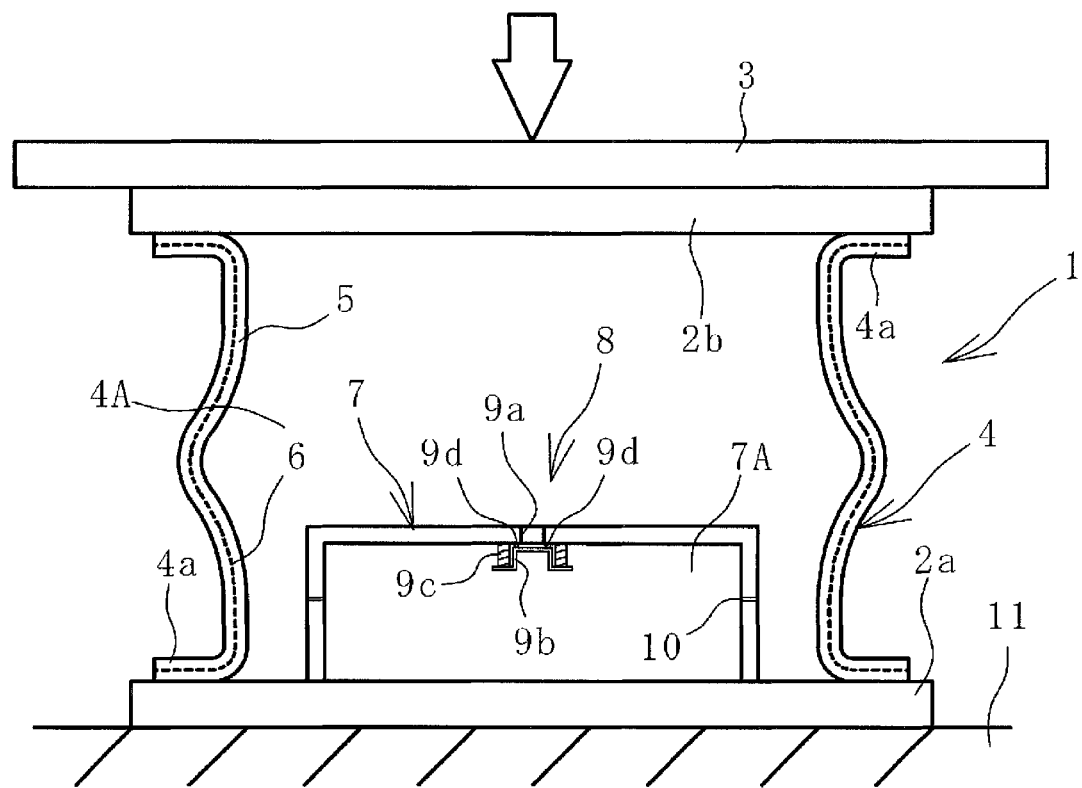
FIG. 2 is a cross-sectional view illustrating the pneumatic fender depicted in FIG. 1 in a state in which the flexible hollow body is beginning to compress.

When a ship contacts the shock-receiving plate 3 of the fender 1 in the state illustrated in FIG. 1, in which the flexible hollow body 4 is not compressed, the shock-receiving plate 3 is pressed down, as illustrated in FIG. 2, and the flexible hollow body 4 enters a compressed state. The casing 7 of the fender 1 is disposed within the inner space 4A of the flexible hollow body 4; thus, the initial pre-compression volume of the flexible hollow body 4 is that of the inner space 4A less the volume of the casing 7. This allows the counter force R when the flexible hollow body 4 first begins to be compressed to be greater than it would be if the casing 7 were not disposed in the inner space 4A of the flexible hollow body 4. Increased counter force R is advantageous in preventing damage as it impedes the flexible hollow body 4 to be excessively compressed.

Figure 3:
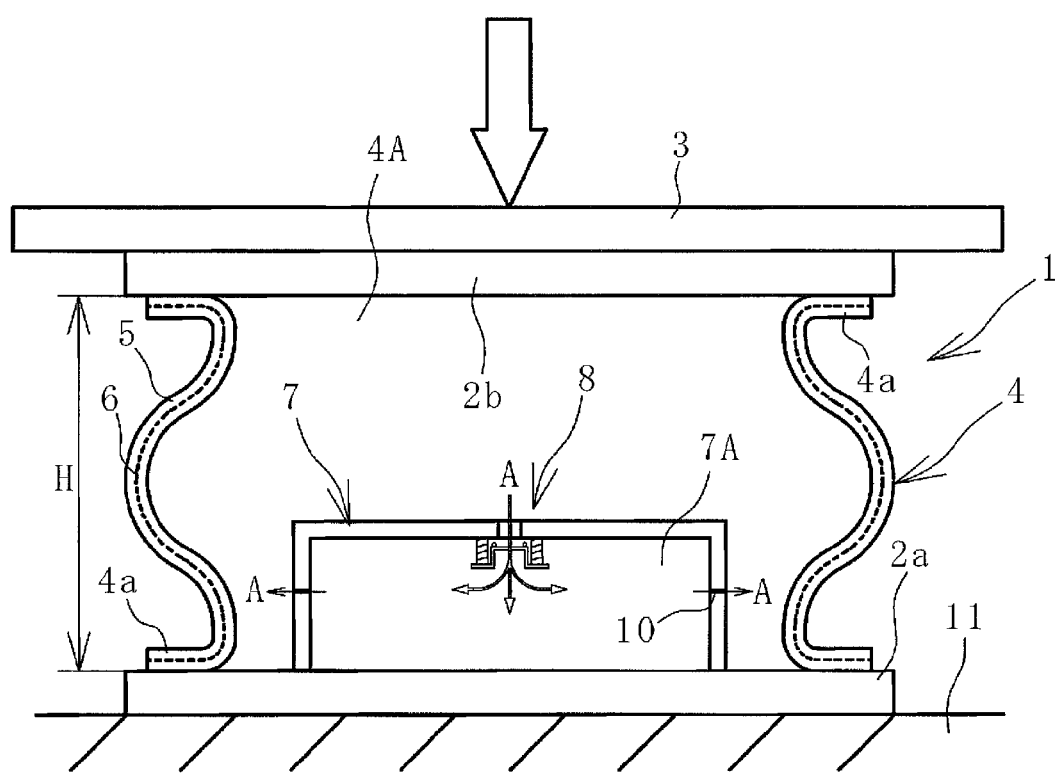
FIG. 3 is a cross-sectional view illustrating the pneumatic fender depicted in FIG. 1 in a state in which a safety valve has opened.
Figure 4:
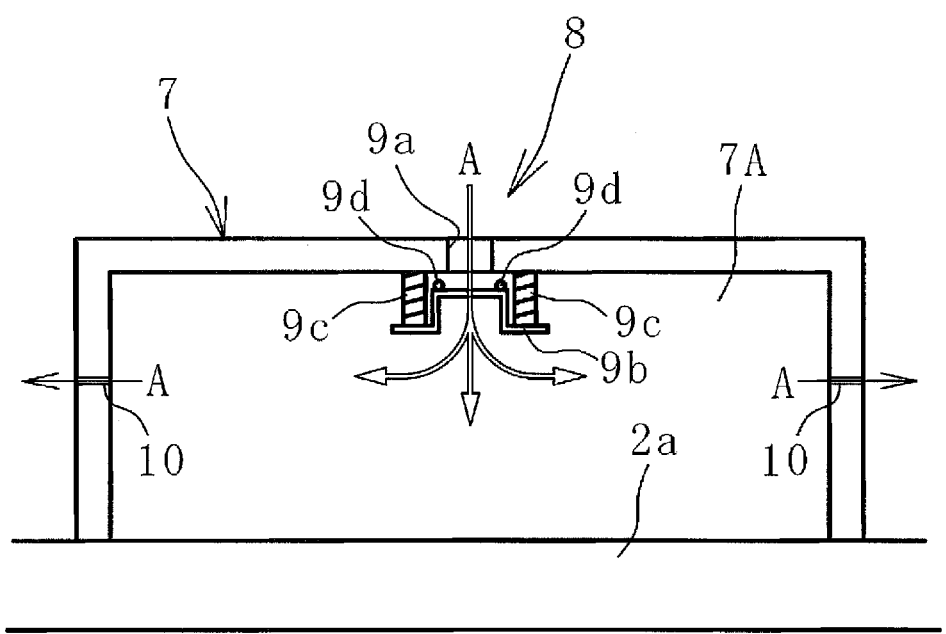
FIG. 4 is a magnified view of the casing depicted in FIG. 3.

As illustrated in FIGS. 3 and 4, as the shock-receiving plate 3 is further pressed down, the flexible hollow body 4 is further compressed, and, when the internal pressure P of the flexible hollow body 4 reaches the predetermined pressure P1, the valve body 9b upon which the predetermined pressure P1 has been placed moves against the biasing force of the biasing member 9c in a direction away from the wall in which the through-hole 9a is formed. As a result, the sealing member 9d moves away from the wall and the safety valve 8 opens. The predetermined pressure P1 at which the safety valve 8 opens is set, for example, to about 20% to 90% of the rated withstand pressure of the fender 1. Rated withstand pressure is the internal pressure of the flexible hollow body 4 when the flexible hollow body 4 is compressed at a maximum compression rate, to be described below.

The space in the inner space 4A of the flexible hollow body 4 outside the casing 7 and the inner space 7A of the casing 7 communicate through the open safety valve 8. In this way, air A flows into the inner space 7A of the casing 7, suppressing increases in the internal pressure P of the flexible hollow body 4, when the internal pressure P of the flexible hollow body 4 reaches a certain degree.

The air A that has flowed into the inner space 7A of the casing 7 is gradually expelled through the orifice 10 to the inner space 4A of the flexible hollow body 4 outside of the casing 7. The expulsion of the air A from the inner space 7A of the casing 7 restores the flexible hollow body 4 to its pre-compression state. In this way, the casing 7 is made to function as an energy-absorbing body without being damaged, allowing for repeated use over extended periods of time. The flexible hollow body 4 can also be used repeatedly over extended periods of time without damage.

In addition, because the orifice 10 through which the air A is expelled from the inner space 7A of the casing 7 is a small hole, the speed at which the flexible hollow body 4 is restored to its pre-compression state is reduced. This reduces the counter force R produced by this restoration, allowing for further reduction in swaying of the ship in contact with the shock-receiving plate 3 during the restoration process.

The total opening area of the plurality of orifices 10 is selected as appropriate; for example, the total opening area of the total orifices 10 is set to 1% to 30%, preferably 2% to 15%, of the area of the wall of the casing 7. This causes the flexible hollow body 4 to be gradually compressed when the ship berths at a low speed, which in turn ensures that the diameter and total area of the orifices 10 are suitably large with respect to the increase in the pressure in the inner space 4A and the pressure is equalized between the inner space 4A and the inner space 7A of the casing 7, thus eliminating the effects of the casing 7 and allowing the berthing energy of the ship to be absorbed at the soft counter force initially possessed by the fender 1.

If, on the other hand, the ship makes an abnormal berthing due to a typhoon or other type of strong winds, the flexible hollow body 4 is dynamically compressed, causing the diameter and total opening area of the orifices 10 to be sufficiently small with respect to increases in the pressure in the inner space 4A and the volume of the flexible hollow body 4 to become that of the inner space 4A less the volume of the casing 7, allowing for increased counter force R. As a result, it is possible to obtain both soft counter force drawing upon the properties of the pneumatic fender according to the berthing speed of the ship and high counter force in response to abnormal berthings.

Figure 5:
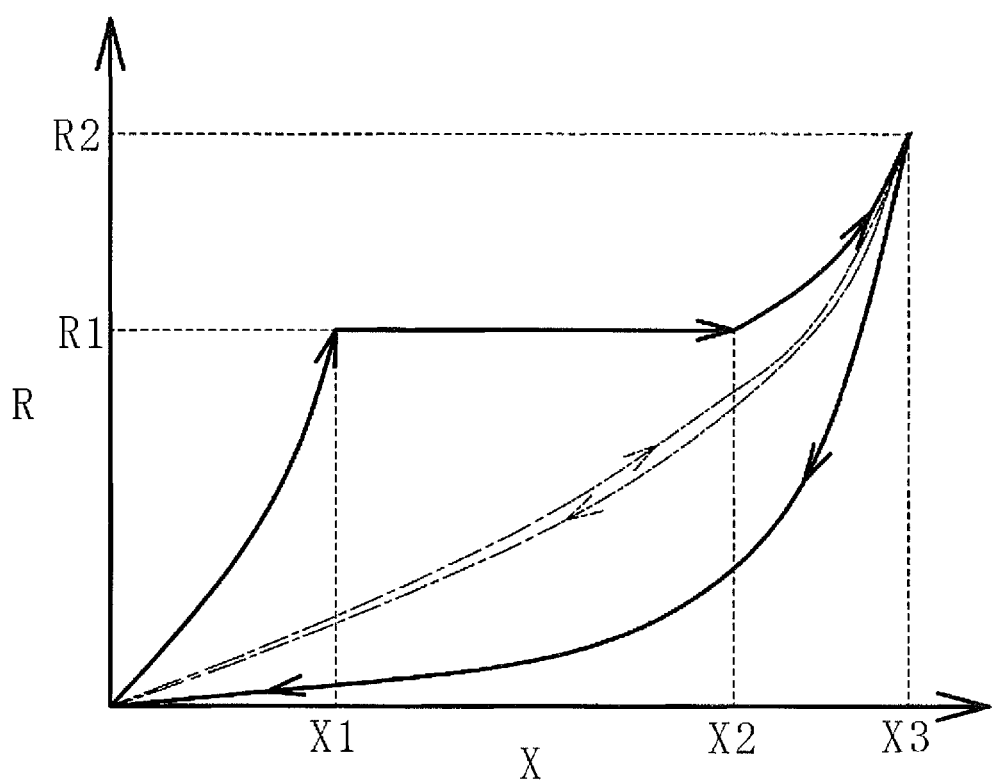
FIG. 5 is a graph showing the relationship between the level of compression of the flexible hollow body depicted in FIG. 1 and counter force.

FIG. 5 schematically shows the relationship between compression level X and counter force R in one cycle of the flexible hollow body 4 being compressed and restored. In FIG. 5, the solid lines represent the fender 1 of the present embodiment, and the single-dashed lines represent a conventional fender in which a casing 7 is not disposed within the inner space 4A of the flexible hollow body 4.

During a state when compression is beginning in which the compression level X is at least 0 and less than X1, the volume of the compressed flexible hollow body 4 is less than that of a conventional fender, as described above. This allows the fender 1 to yield greater counter force R compared to the conventional fender.

When the flexible hollow body 4 is further compressed so that the compression level X reaches X1 and the internal pressure P of the flexible hollow body 4 reaches a predetermined pressure P1 (the counter force R at which point being R1), the safety valve 8 opens and air A flows into the inner space 7A of the casing 7. The flexible hollow body 4 remains at a generally constant internal pressure P1 until the compression level X reaches X2, suppressing increases in internal pressure and yielding a generally constant counter force R1 for the counter force R.

When the flexible hollow body 4 is further compressed so that the compression level X reaches X2, and the inflowing air A causes the pressure in the inner space 7A to become equal to the internal pressure of the flexible hollow body 4, the counter force R increases. After the flexible hollow body 4 has been compressed to the point that counter force R2 is reached, the flexible hollow body 4 is restored to its pre-compression state when the compression is released. The restoration occurs at a slow speed as described above, thereby reducing the counter force R. This is advantageous in reducing ship swaying compared to a conventional fender.

It is preferable to set the projection height h of the casing 7 to 40% or less of the spacing H between the mounting plate 2a and the mounting plate 2b, and the volume of the inner space 7A of the casing 7 to 10% to 35% of the volume of the inner space 4A of the flexible hollow body 4. This is because the casing 7 and the pressed mounting plate 2b tend to interfere with each other if the projection height h exceeds 40% of the spacing H. In addition, it is difficult to sufficiently increase the counter force R produced when the flexible hollow body 4 begins to be compressed if the volume of the inner space 7A of the casing 7 is less than 10% of the volume of the inner space 4A of the flexible hollow body 4, and the casing 7 and the pressed mounting plate 2b tend to interfere with each other if the volume of the inner space 7A of the casing 7 exceeds 35% of the volume of the inner space 4A of the flexible hollow body 4.

In order to impede interference between the casing 7 and the pressed mounting plate 2b, the wall of the casing 7 facing the mounting plate 2b may be in a planar shape parallel with the mounting plate 2b. Providing the safety valve 8 on the inner space 7A side of the casing 7 as in the present embodiment allows interference between the safety valve 8 and the pressed mounting plate 2b to be prevented.

Figure 6:
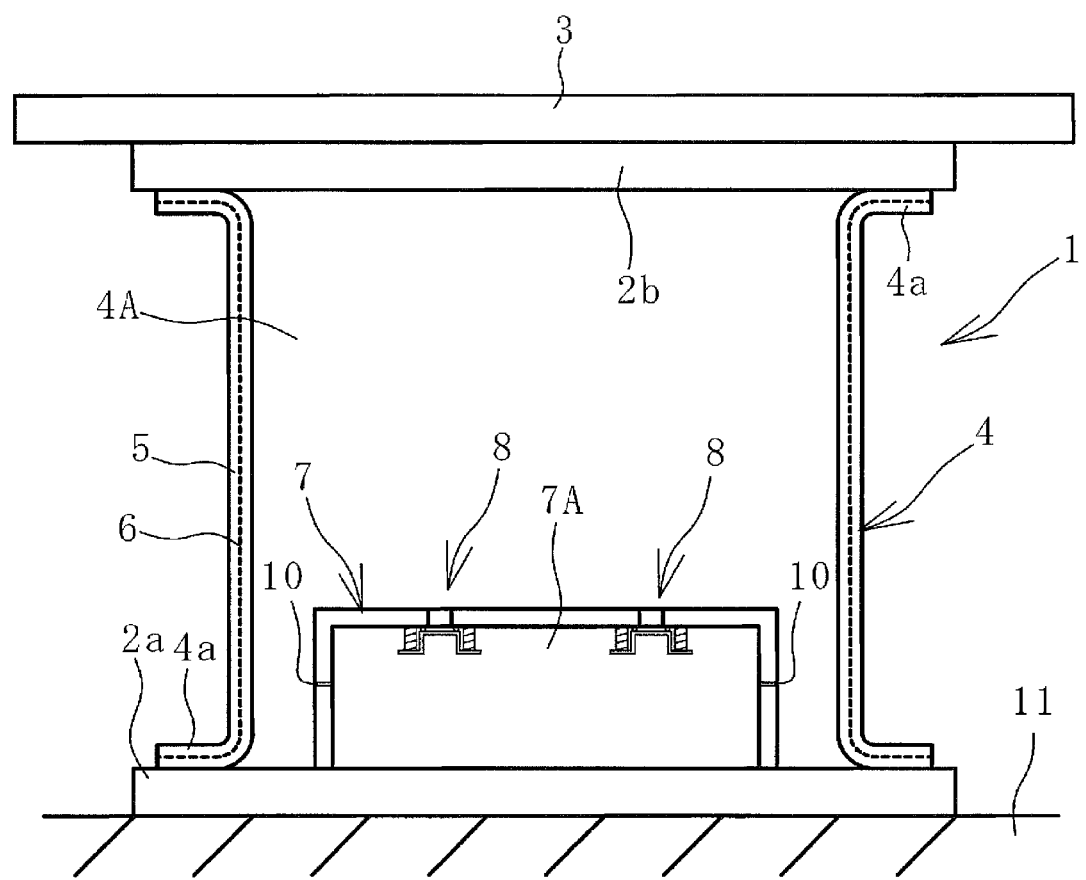
FIG. 6 is a cross-sectional view illustrating another embodiment.

The safety valve 8 may conceivable fail for some reason or another; thus, it is preferable to provide a plurality of valves, as illustrated in FIG. 6. The plurality of safety valves 8 can all be set to open at the same predetermined pressure P1. Alternatively, at least one of the plurality of safety valves 8 can be set to open at a different predetermined pressure P1.

If all the safety valves 8 are set to open at the same predetermined pressure P1, when the internal pressure P of the flexible hollow body 4 reaches the predetermined pressure P1 (counter force R1) as shown in FIG. 5, the compression level X of the flexible hollow body 4 comparatively rapidly changes from X1 to X2 while maintaining a constant counter force R1, increasing compression speed.

On the other hand, if there is a mixture of safety valves 8 that open at different timings, the horizontal linear section at which counter force R is constant shown in FIG. 5 is divided into multiple sections. This allows the compression speed of the flexible hollow body 4 to be reduced over the former case.

Figure 7:
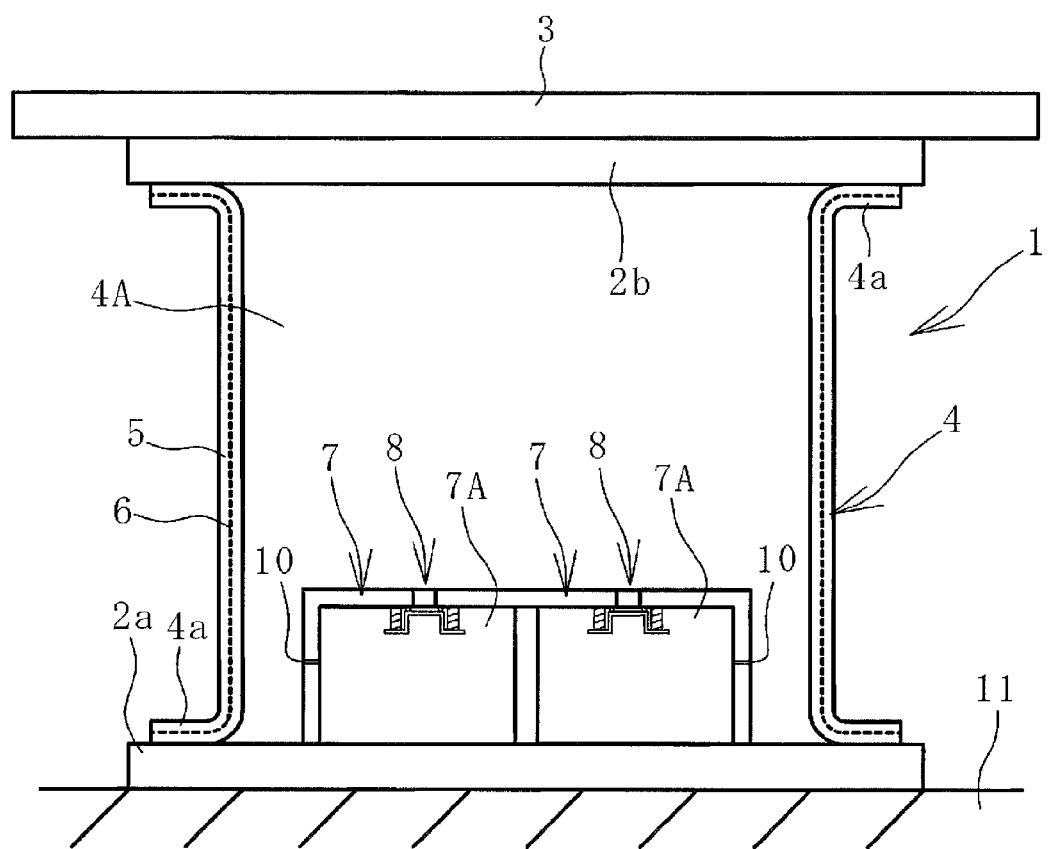
FIG. 7 is a cross-sectional view illustrating yet another embodiment.

If a plurality of safety valves 8 is provided, the casing 7 can be divided into multiple casings as illustrated in FIG. 7. The inner spaces 7A of the divided casings 7 can be set all to the same volume or to different volumes.

For example, the volume of the inner space 7A of a casing 7 having a safety valve 8 that opens at a low predetermined pressure P1 is less than the volume of the inner space 7A of a casing 7 having a safety valve 8 that opens at a high predetermined pressure P1 according to the energy absorption performance required for the fender 1. Alternatively, the volume of the inner space 7A of a casing 7 having a safety valve 8 that opens at a low predetermined pressure P1 is greater than the inner space 7A of a casing 7 having a safety valve 8 that opens at a high predetermined pressure P1. In this way, the pressure in the respective inner spaces 7A of the casings 7 can be controlled independently of the pressure in the other inner spaces 7A of the casings 7.

The safety valve 8 can also have a variable-pressure structure allowing the predetermined pressure P1 at which the valve opens to be altered. In the present embodiment, the pressure at which the safety valve 8 opens can easily be altered by replacing the biasing member 9c with another having a different biasing force. Adopting a variable-pressure structure of this sort allows for various fenders 1 of different energy absorption performance to be easily manufactured simply by changing the safety valve 8. This minimizes the cost of manufacturing fenders 1 capable of handling ships of various sizes at an early stage, and is advantageous for manufacturing.

Figure 8:
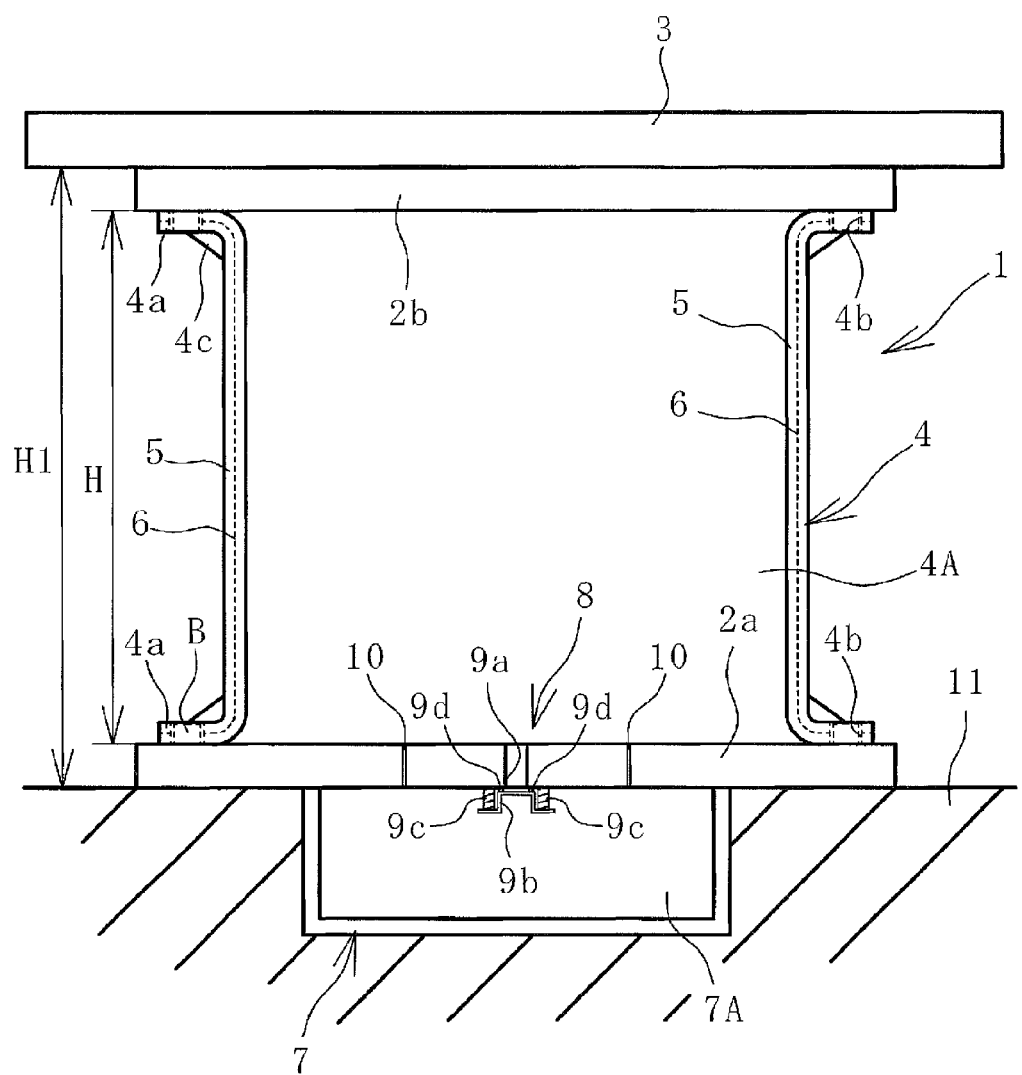
FIG. 8 is a cross-sectional view illustrating an embodiment in which a casing is provided outside the flexible hollow body.

The embodiment of a fender 1 illustrated in FIG. 8 is provided with a mounting plate 2a, a mounting plate 2b, and a flexible hollow body 4. The one mounting plate 2a is mounted on a quay 11 or the like, a shock-receiving plate 3 is mounted on a front side of the other mounting plate 2b, and the side of a ship or the like contacts the shock-receiving plate 3.

The flexible hollow body 4 is interposed between the mounting plate 2a and the mounting plate 2b and is joined to the mounting plates 2a, 2b in an airtight manner. The spacing H between the mounting plate 2a and the mounting plate 2b, i.e., the height dimension of the flexible hollow body 4, is set on the basis of the energy absorption performance and the like required for the fender 1.

The flexible hollow body 4 has a cylindrical shape provided with flanges 4a on both ends, and is constituted by rubber 5 in which a reinforcing layer 6 has been embedded. Mounting holes 4b are formed in each of the flanges 4a at intervals along the circumferential direction. Anchoring members B such as bolts are embedded in the mounting holes 4b so that the heads thereof do not protrude out of the mounting holes 4b. Each of the flanges 4a is anchored to the mounting plates 2a, 2b by these anchoring members B. In the present embodiment, corner supports 4c are provided extending in an annular shape at the corners of the flanges 4a.

The casing 7 is provided projecting from the rear surface side of the one mounting plate 2a. Specifically, the casing 7 is mounted on an outside surface of the one mounting plate 2a opposite a side in the interior of the flexible hollow body 4. In the present embodiment, the casing 7 is disposed within a space formed in the quay 11. The casing 7 is a rigid structure formed from a rigid material such as steel or iron.

The mounting plate 2a is provided with an orifice 10 and a safety valve 8. The orifice 10 allows for communication between the inner space 4A of the flexible hollow body 4 and the interior space 7A of the casing 7. A small hole (having, for example, an opening area of about 0.5 mm² to 80 mm² or an opening diameter of about 1 mm to 10 mm) formed in the mounting plate 2a can be used as the orifice 10. The orifice 10 is not limited to being a small hole; any structure that yields the same effects as a small hole can be used. There is no particular limitation upon the number of orifices 10, but it is preferable to provide a plurality thereof as they can conceivably become blocked for various reasons.

The safety valve 8 provided in the mounting plate 2a opens when the internal pressure P of the flexible hollow body 4 reaches the predetermined pressure P1. The inner space 4A and the inner space 7A of the casing 7 communicate through the open safety valve 8.

The safety valve 8 of the present embodiment is constituted by a through-hole 9a formed in the mounting plate 2a, a valve body 9b, a biasing member 9c such as a spring, and a sealing member 9d. The valve body 9b is biased by the biasing member 9c toward the rear surface of the mounting plate 2a. The sealing member 9d, which is mounted on the valve body 9b, is compression bonded to the rear surface of the mounting plate 2a so as to surround the periphery of the through-hole 9a, thereby closing the safety valve 8 to block the through-hole 9a. The safety valve 8 is not limited to the structure described in the present embodiment; any structure in which the safety valve 8 opens when the internal pressure P of the flexible hollow body 4 reaches the predetermined pressure P1 is acceptable.

Figure 9:
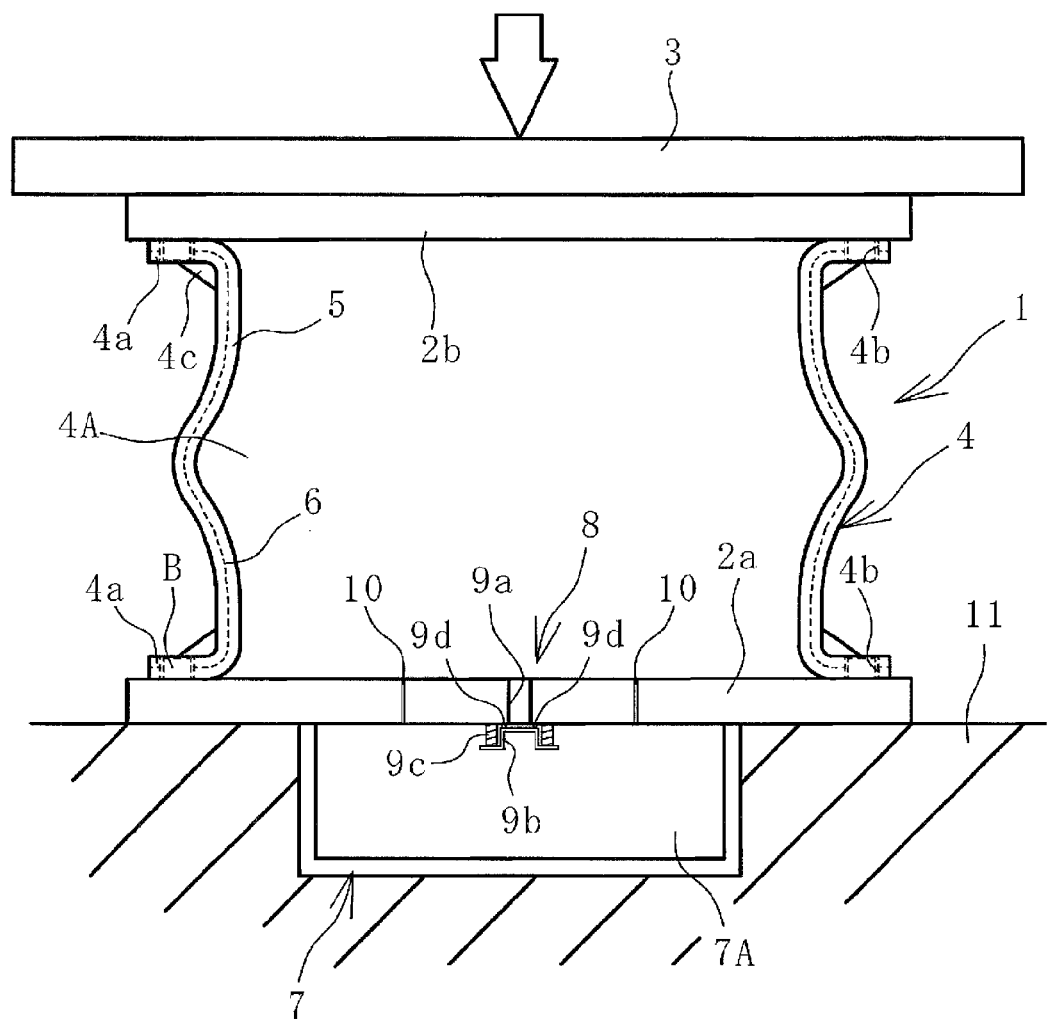
FIG. 9 is a cross-sectional view illustrating the pneumatic fender depicted in FIG. 8 in a state in which the flexible hollow body is beginning to compress.

When a ship contacts the other mounting plate 2b of the fender 1 illustrated in FIG. 8, in which the flexible hollow body 4 is in an uncompressed state, with the shock-receiving plate 3 interposed therebetween, the mounting plate 2b is pressed down, and the flexible hollow body 4 enters a compressed state, as illustrated in FIG. 9. Because the internal pressure P of the flexible hollow body 4 has not reached the predetermined pressure P1, the safety valve 8 is not open.

Figure 10:
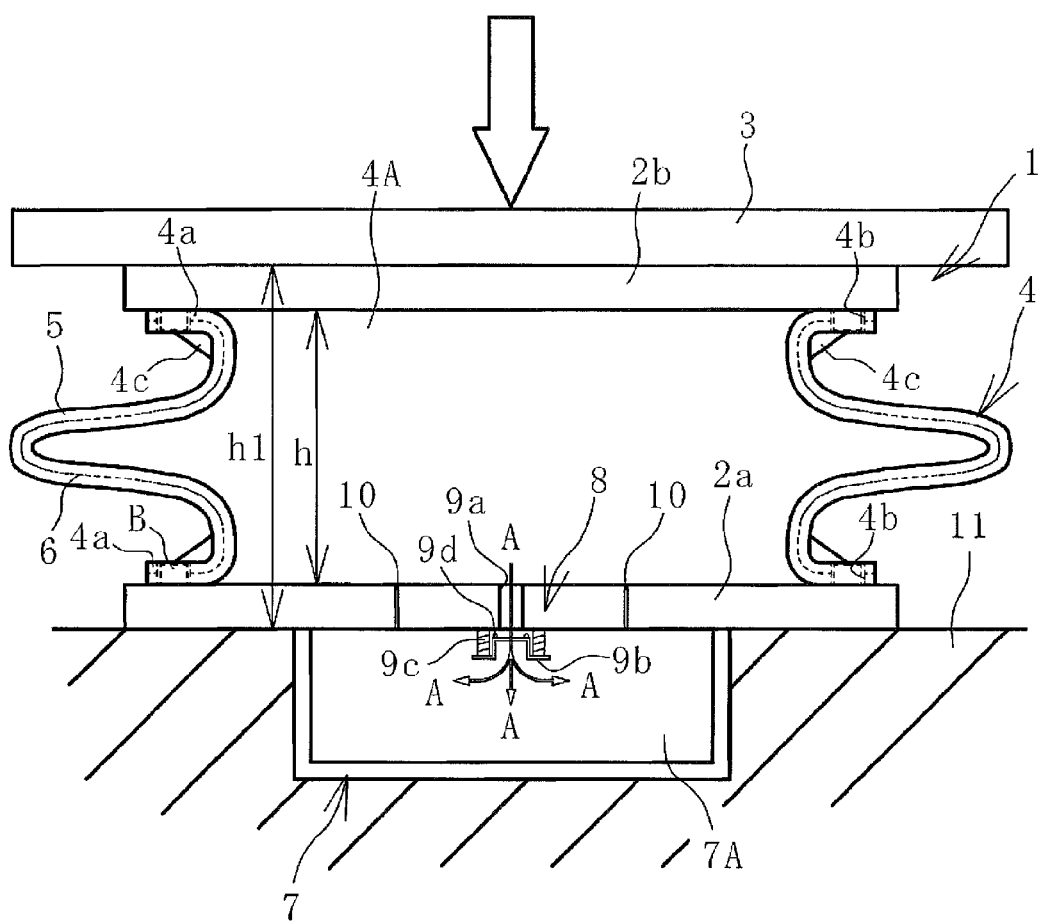
FIG. 10 is a cross-sectional view illustrating the pneumatic fender depicted in FIG. 8 in a state in which a safety valve has opened.
Figure 11:
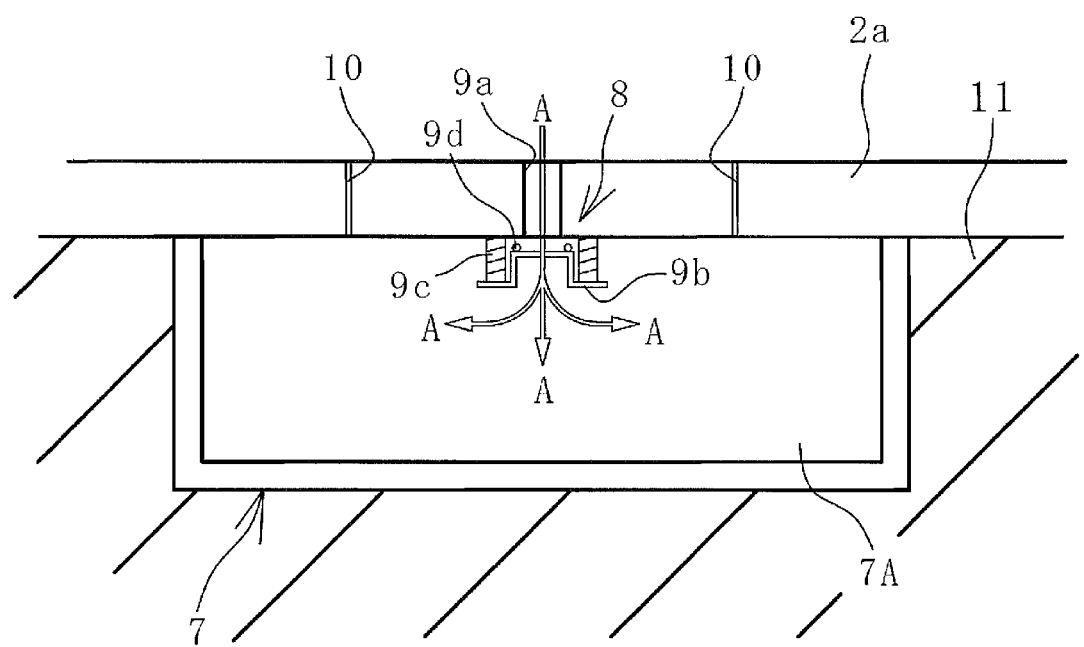
FIG. 11 is a magnified view of the vicinity of the casing depicted in FIG. 10.

As illustrated in FIGS. 10 and 11, as the mounting plate 2b is further pressed down, the flexible hollow body 4 is further compressed, and, when the internal pressure P of the flexible hollow body 4 reaches the predetermined pressure P1, the valve body 9b upon which the predetermined pressure P1 has been placed moves against the biasing force of the biasing member 9c in a direction away from the rear surface of the mounting plate 2a. As a result, the sealing member 9d moves away from the rear surface of the mounting plate 2a, and the safety valve 8 opens. The predetermined pressure P1 at which the safety valve 8 opens is set, for example, to about 20% to 90% of the rated withstand pressure of the fender 1. Rated withstand pressure is the internal pressure of the flexible hollow body 4 when the flexible hollow body 4 is compressed at a maximum compression rate, to be described below.

The inner space 4A of the flexible hollow body 4 and the inner space 7A of the casing 7 communicate through the open safety valve 8. In this way, air A flows into the inner space 7A of the casing 7, suppressing increases in the internal pressure P of the flexible hollow body 4, when the internal pressure P of the flexible hollow body 4 reaches a certain degree.

The opening of the safety valve 8 causes the compressed volume when the fender 1 is pressed down to increase by the volume of the inner space 7A of the casing 7, greatly increasing energy absorption performance. The flexible hollow body 4 is thus capable of handling abrupt increases in the berthing energy from a ship without the need to increase the size of the flexible hollow body 4. Concomitantly, it is also possible to suppress damage to the flexible hollow body 4 caused by excessive compression.

Figure 12:
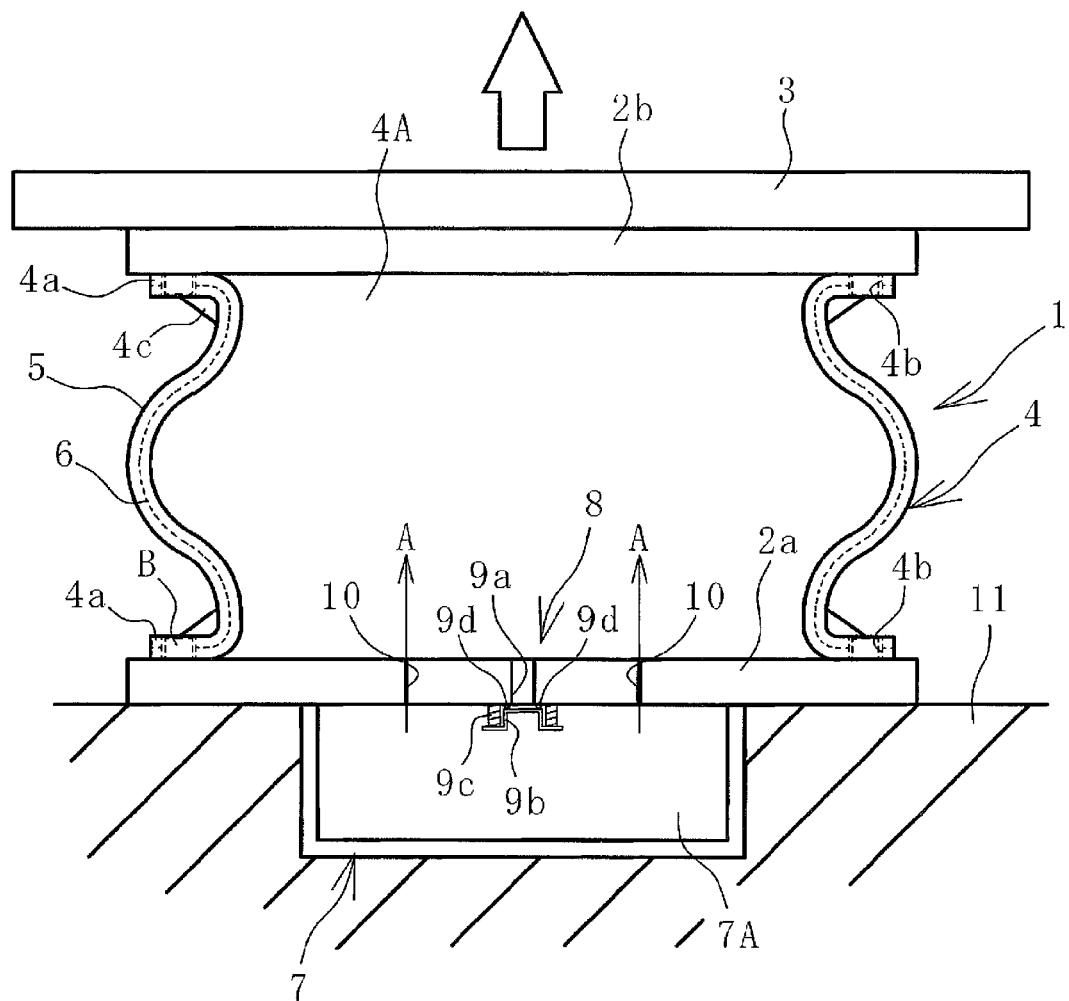
FIG. 12 is a cross-sectional view illustrating a state in which air having flowed into the interior of the casing flows back to the interior of the flexible hollow body.

Subsequently, when the ship pulls away from the shock-receiving plate 3, the compression upon the mounting plate 2b is released, and the internal pressure P of the flexible hollow body 4 falls below less than the predetermined internal pressure P1, the safety valve 8 closes as illustrated in FIG. 12. The air A that has flowed into the inner space 7A of the casing 7 gradually flows through the orifice 10 back into the inner space 4A of the flexible hollow body 4. The flowing back of the air A restores the flexible hollow body 4 to its pre-compression state. In this way, the casing 7 is made to function as an energy-absorbing body without being damaged, allowing for repeated use over extended periods of time. The flexible hollow body 4 can also be used repeatedly over extended periods of time without damage.

In addition, because the orifice 10 through which the air A is allowed to flow back from the inner space 7A of the casing 7 is a small hole, the speed at which the flexible hollow body 4 is restored to its pre-compression state is reduced. This reduces the counter force R produced by this restoration, allowing for further reduction in swaying of the ship in contact with the shock-receiving plate 3 during the restoration process.

The total orifice 10 opening area is selected as appropriate; for example, the total opening area of a plurality of orifices 10 is set to 1% to 30%, preferably 2% to 15%, of the area of the mounting plate 2a within the range of the inner radius of the flexible hollow body 4. This causes the flexible hollow body 4 to be gradually compressed when the ship berths at a low speed, which in turn ensures that the diameter and total area of the orifices 10 are sufficiently large with respect to the increase in the pressure in the inner space 4A and the pressure is equalized between the inner space 4A and the inner space 7A of the casing 7, thus allowing the berthing energy of the ship to be absorbed at the soft counter force R initially possessed by the fender 1.

If, on the other hand, the ship makes an abnormal berthing due to a typhoon or other type of strong winds, the flexible hollow body 4 is dynamically compressed, causing the diameter and total opening area of the orifices 10 to be sufficiently small with respect to increases in the pressure in the inner space 4A and allowing the counter force R to be increased until the safety valve 8 opens. As a result, it is possible to obtain both soft counter force drawing upon the properties of the pneumatic fender according to the berthing speed of the ship and high counter force in response to abnormal berthings.

Figure 13:
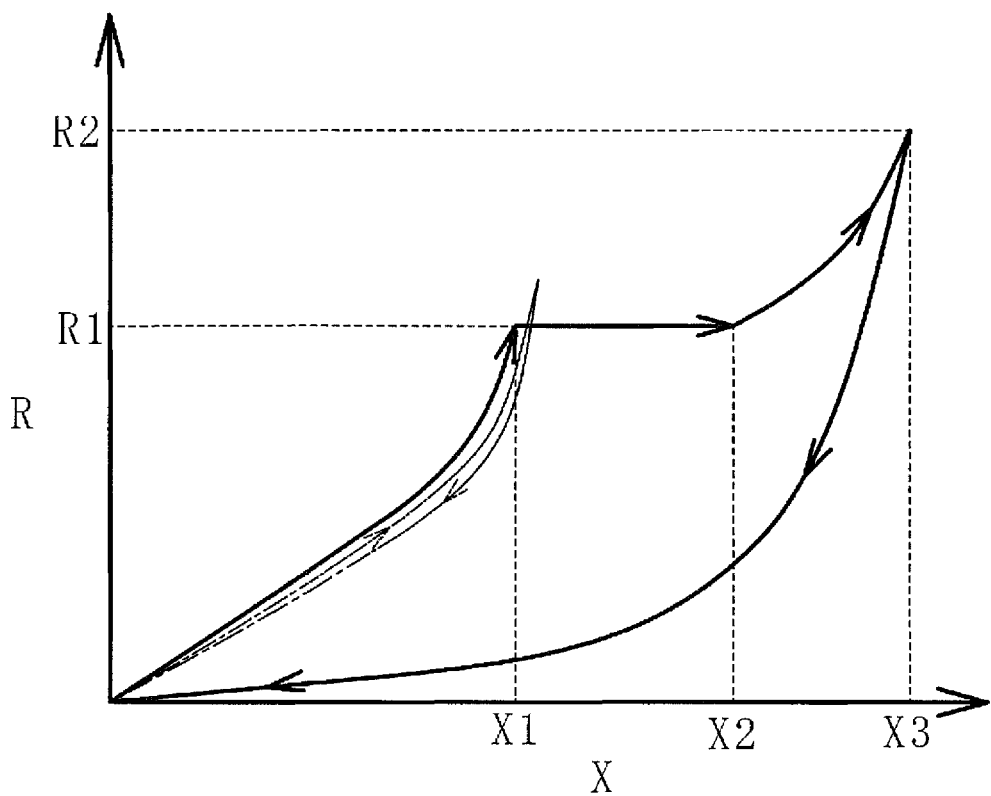
FIG. 13 is a graph showing the relationship between the level of compression of the flexible hollow body depicted in FIG. 8 and counter force.

FIG. 13 schematically shows the relationship between compression level X and counter force R in one cycle of the flexible hollow body 4 being compressed and restored. In FIG. 13, the solid lines represent the fender 1 of the present embodiment, and the single-dashed lines represent a conventional fender in which a casing 7 is not disposed.

In an initial state of compression in which the compression level X is at least 0 and less than X1, counter force R similar to that of a conventional fender can be obtained. When the flexible hollow body 4 is further compressed so that the compression level X reaches X1 and the internal pressure P of the flexible hollow body 4 reaches a predetermined pressure P1 (the counter force R at which point being R1), the safety valve 8 opens and air A flows into the inner space 7A of the casing 7. The flexible hollow body 4 remains at a generally constant internal pressure P1 until the compression level X reaches X2, suppressing increases in internal pressure and yielding a generally constant counter force R1 for the counter force R.

When the flexible hollow body 4 is further compressed so that the compression level X reaches X2, and the inflowing air A causes the pressure in the inner space 7A to become equal to the internal pressure of the flexible hollow body 4, the counter force R increases. After the flexible hollow body 4 has been compressed to the point that counter force R2 is reached, the flexible hollow body 4 is restored to its pre-compression state when the compression is released. The restoration occurs at a slow speed as described above, thereby reducing the counter force R. This is advantageous in reducing ship swaying compared to a conventional fender.

The inner space 7A of the casing 7 can be any desired volume; for example, the volume thereof is about 20% to 100% of the volume of the inner space 4A of the flexible hollow body 4. There will be less improvement in the energy absorption performance of the fender 1 if the volume is less than 20% of the volume of the inner space 4A of the flexible hollow body 4, and excessive space will be required for the casing 7 if the volume exceeds 100% of the volume of the inner space 4A of the flexible hollow body 4.

In the present embodiment, the compression volume can be increased by the volume of the inner space 7A of the casing 7. Thus, although the maximum compression rate of a conventional flexible hollow body 4 is about 60% to 70%, a maximum compression rate of about 80% to 90% is possible in the present technology. The maximum compression rate is calculated using the spacing H between the mounting plate 2a and the mounting plate 2b (not including the thickness of the mounting plates 2a, 2b) when the fender 1 is in an uncompressed neutral state, and a spacing ha between the mounting plate 2a and the mounting plate 2b (not including the thickness of the mounting plates 2a, 2b) when the flexible hollow body 4 is in a state of maximum compression according to the formula $((H-ha)/H)\times100(\%)$. Alternatively, the maximum compression rate can also be defined taking as H1 the spacing between the mounting plate 2a and the mounting plate 2b (not including the thickness of the mounting plates 2a, 2b) in a neutral state and as h1 the spacing between the mounting plate 2a and the mounting plate 2b (not including the thickness of the mounting plates 2a, 2b) when the flexible hollow body 4 is in a state of maximum compression. In this case, the maximum compression rate as calculated according to the formula $((H1-h1)/H1)\times100(\%)$ is about 80% to 85%.

In the present embodiment, the anchoring members B are embedded in the mounting holes 4b, preventing the outer peripheral surface of the outwardly swelling flexible hollow body 4 from contacting the anchoring members B even if the flexible hollow body 4 is greatly compressed as illustrated in FIG. 10. As a result, disadvantage such as the outer peripheral surface of the flexible hollow body 4 rubbing against and being damaged by the anchoring members B can be eliminated. By providing the corner supports 4c, it is possible to more reliably impede the outer peripheral surface of the outwardly swelling flexible hollow body 4 from contacting the anchoring members B. As in the previously described embodiment, the flanges 4a can be anchored to the facing mounting plates 2a, 2b by the anchoring members B, which are embedded in the mounting holes 4b.

Figure 14:
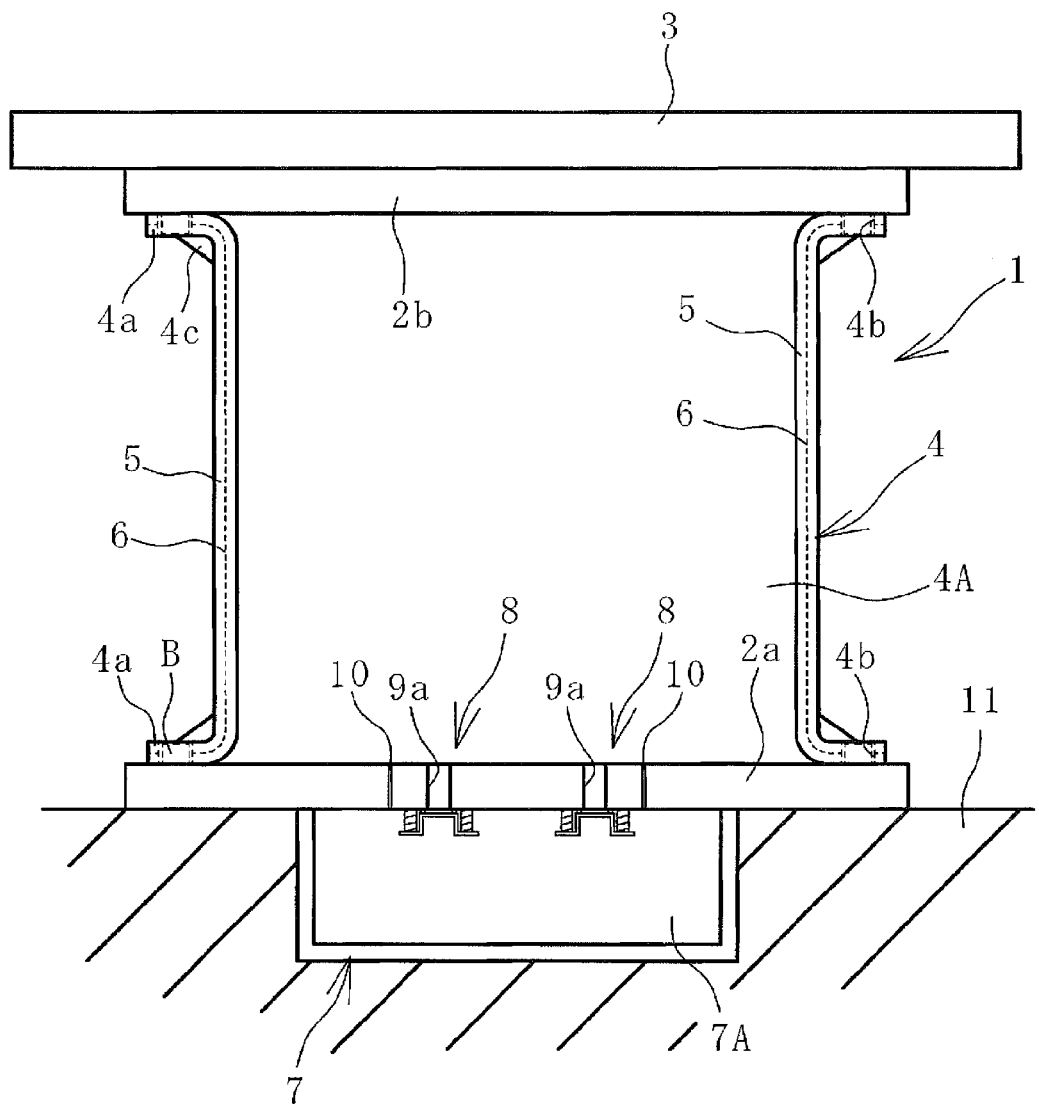
FIG. 14 is a cross-sectional view illustrating another embodiment.

The safety valve 8 may conceivable fail for some reason or another; thus, it is preferable to provide a plurality of valves, as illustrated in FIG. 14. The plurality of safety valves 8 can all be set to open at the same predetermined pressure P1. Alternatively, at least one of the plurality of safety valves 8 can be set to open at a different predetermined pressure P1.

If all the safety valves 8 are set to open at the same predetermined pressure P1, when the internal pressure P of the flexible hollow body 4 reaches the predetermined pressure P1 (counter force R1) as shown in FIG. 13, the compression level X of the flexible hollow body 4 comparatively rapidly changes from X1 to X2 while maintaining a constant counter force R1, increasing compression speed.

On the other hand, if there is a mixture of safety valves 8 that open at different timings, the horizontal linear section at which counter force R is constant shown in FIG. 13 is divided into multiple sections. This allows the compression speed of the flexible hollow body 4 to be reduced over the former case.

Figure 15:
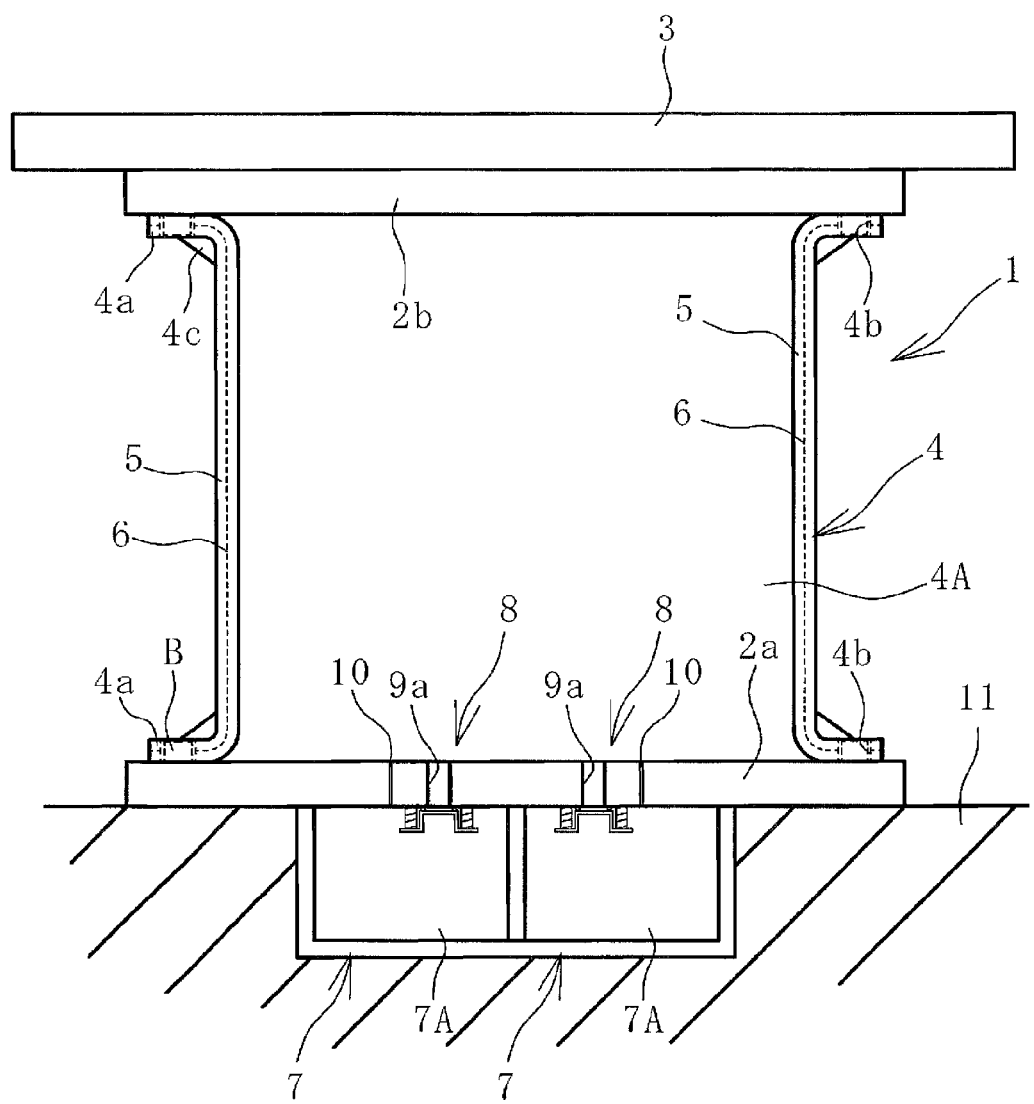
FIG. 15 is a cross-sectional view illustrating yet another embodiment.

If a plurality of safety valves 8 is provided, the casing 7 can be divided into multiple casings as illustrated in FIG. 15. The inner spaces 7A of the divided casings 7 can be set all to the same volume or to different volumes.

For example, the volume of the inner space 7A of a casing 7 having a safety valve 8 that opens at a low predetermined pressure P1 is less than the volume of the inner space 7A of a casing 7 having a safety valve 8 that opens at a high predetermined pressure P1 according to the energy absorption performance required for the fender 1. Alternatively, the volume of the inner space 7A of a casing 7 having a safety valve 8 that opens at a low predetermined pressure P1 is greater than the inner space 7A of a casing 7 having a safety valve 8 that opens at a high predetermined pressure P1. In this way, the pressure in the respective inner spaces 7A of the casings 7 can be controlled independently of the pressure in the other inner spaces 7A of the casings 7.

The safety valve 8 can also have a variable-pressure structure allowing the predetermined pressure P1 at which the valve opens to be altered. In the present embodiment, the pressure at which the safety valve 8 opens can easily be altered by replacing the biasing member 9c with another having a different biasing force. Adopting a variable-pressure structure of this sort allows for various fenders 1 of different energy absorption performance to be easily manufactured simply by changing the safety valve 8. This minimizes the cost of manufacturing fenders 1 capable of handling ships of various sizes at an early stage, and is advantageous for manufacturing.

The invention claimed is:

1. A pneumatic fender comprising a flexible hollow body provided between facing mounting plates, the fender comprising:
   an orifice that allows for communication between an interior space of the flexible hollow body and an interior space of a rigid casing that is provided on a surface of one of the mounting plates; and
   a safety valve that opens and allows for communication between the interior space of the flexible hollow body and the interior space of the casing by opening when the internal pressure of the flexible hollow body reaches a predetermined pressure;
   wherein one of the mounting plates is movable relative to another of the mounting plates upon an impact to the pneumatic fender.

2. The pneumatic fender according to claim 1, wherein the casing is provided on a surface of the one mounting plate positioned within the interior of the flexible hollow body.

3. The pneumatic fender according to claim 2, wherein the height to which the casing projects is set to 40% or less of a spacing between the mounting plates, and the volume of the inner space of the casing is set to 10% to 35% of the volume of the inner space of the flexible hollow body.

4. The pneumatic fender according to claim 1, wherein the casing is provided on an external surface of the one mounting plate on a side opposite a side in the interior of the flexible hollow body.

5. The pneumatic fender according to claim 4, wherein the maximum compression rate of the flexible hollow body is set to 80% to 90%.

6. The pneumatic fender according to claim 1, wherein the safety valve comprises a plurality of safety valves.

7. The pneumatic fender according to claim 6, wherein at least one of the plurality of safety valves opens at a different predetermined pressure than another at least one of the plurality of safety valves.

8. The pneumatic fender according to claim 6, wherein all of the plurality of safety valves open at the same predetermined pressure.

9. The pneumatic fender according to claim 1, wherein the safety valve has a variable-pressure structure allowing the predetermined pressure at which the valve opens to be altered.

10. The pneumatic fender according to claim 1, wherein anchoring members for anchoring each of flanges at both ends of the flexible hollow body to the facing mounting plates are embedded in the flanges.

* * * * *